United States Patent
Cox et al.

(10) Patent No.: US 6,466,784 B1
(45) Date of Patent: *Oct. 15, 2002

(54) TECHNIQUE FOR MONITORING AND ATTEMPTING TO CONNECT DESTINATION TELEPHONE AND PROVIDING INFORMATION ASSISTANCE UPON DETECTION OF UNSATISFACTORY CONNECTION

(75) Inventors: Patrick M. Cox, Beaverton; Adrian P. Powell, Molalla; Paul W. Filliger, Silverton; Michael A. Kepler, Aloha, all of OR (US)

(73) Assignee: Metro One Telecommunications, Inc., Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/447,465

(22) Filed: Nov. 22, 1999

Related U.S. Application Data

(63) Continuation of application No. 09/135,155, filed on Aug. 17, 1998, which is a continuation of application No. 08/552,222, filed on Nov. 2, 1995, now Pat. No. 5,797,092, which is a continuation-in-part of application No. 08/468,900, filed on Jul. 6, 1995, now abandoned, which is a continuation-in-part of application No. 08/234,644, filed on Apr. 28, 1994, now abandoned.

(51) Int. Cl.[7] ............................................... H04M 3/42
(52) U.S. Cl. .................. 455/414; 455/416; 455/417; 455/445; 379/201.02; 379/202.01; 379/207.01; 379/212.01; 379/218.01
(58) Field of Search ................................ 455/403, 414, 455/416, 417, 422, 445; 379/212, 210, 211, 214, 265, 201–202, 203, 209, 201.01, 201.02, 202.01, 207.01, 207.02, 211.02, 212.01, 218.01

(56) References Cited

U.S. PATENT DOCUMENTS

| | | |
|---|---|---|
| 837,894 A | 12/1906 | Aven |
| 1,589,444 A | 6/1926 | Thurston et al. |
| 1,714,303 A | 5/1929 | Friendly |

(List continued on next page.)

OTHER PUBLICATIONS

Bell Atlantic, "White Pages Northern Virginia", p. 37, Jan. 1995.

IBM Technical Disclosure, "Method and Apparatus for Automatic Contextual call Return, Calendering, and Address Book Search", vol. 37, No. 04A, Apr. 1994.

(List continued on next page.)

*Primary Examiner*—Doris H. To
(74) *Attorney, Agent, or Firm*—Kaye Scholer LLP

(57) ABSTRACT

A cellular telephone subscriber who wishes directory assistance services is connected in the conventional manner to an operator who identifies a destination telephone number desired by the subscriber. As in the prior art, the operator then initiates a call connecting the subscriber to the destination telephone number. In a preferred embodiment, the operator locates a desired destination telephone number in a computer database, and can select automatic dialing of the located number. Further, rather than dropping all further involvement with the call, the preferred embodiment of the present invention continually monitors the connection thereby established for a predetermined DTMF signal issued by the customer, such as that obtained by pressing the "*" button. If such a signal is detected, the customer is transferred to a directory assistance operator, who can then provide whatever further assistance is needed (e.g. redialing a busy number, or providing further directory assistance). This feature can be disabled, manually or automatically, if the destination number makes its own use of the DTMF signals.

30 Claims, 2 Drawing Sheets

U.S. PATENT DOCUMENTS

| | | |
|---|---|---|
| 4,190,493 A | 2/1980 | Chambers et al. |
| 4,696,028 A | 9/1987 | Morganstein et al. |
| 4,817,129 A | 3/1989 | Riskin |
| 4,908,825 A | 3/1990 | Vea |
| 4,908,850 A | 3/1990 | Masson et al. |
| 4,922,519 A | 5/1990 | Daudelin |
| 4,932,042 A | 6/1990 | Baral et al. |
| 4,959,855 A | 9/1990 | Daudelin |
| 4,979,206 A | 12/1990 | Padden et al. |
| 5,056,134 A | 10/1991 | Bauer et al. |
| 5,063,591 A | 11/1991 | Jodoin |
| 5,157,718 A | 10/1992 | Kaplan et al. |
| 5,163,083 A | 11/1992 | Dowden et al. |
| 5,181,237 A | 1/1993 | Dowden et al. |
| 5,187,740 A | 2/1993 | Swaim et al. |
| 5,222,120 A | 6/1993 | McLeod et al. |
| 5,339,352 A | 8/1994 | Armstrong et al. |
| 5,353,336 A | 10/1994 | Hou et al. |
| 5,414,754 A | 5/1995 | Pugh et al. |
| 5,418,844 A | 5/1995 | Morrisey et al. |
| 5,479,488 A | 12/1995 | Lennig et al. |
| 5,511,111 A | 4/1996 | Serbetcioglu et al. |
| 5,517,560 A | 5/1996 | Greenspan |
| 5,590,187 A * | 12/1996 | Greenspan .................. 379/212 |
| 5,646,987 A | 7/1997 | Gerber et al. |
| 5,689,547 A | 11/1997 | Molne |
| 5,768,513 A | 6/1998 | Kuthyar et al. |
| 5,797,092 A * | 8/1998 | Cox et al. .................... 455/414 |
| 6,035,190 A * | 3/2000 | Cox et al. .................... 455/414 |

OTHER PUBLICATIONS

IBM Technical Disclosure, "Mechanism to Automate Updating Obsolete Telephone Numbers", vol. 37, No. 04A, Apr. 1994.

America Online, "Global Positioning Satellite (GPS) Technology and the Cellular Phone Network", Apr. 1995.

America Online, "GPS at the Fingertips of Car Owners", Apr. 1995.

America Online, "Combines the Cellular Network with Global Positioning", Apr. 1995.

* cited by examiner

TECHNIQUE FOR MONITORING AND ATTEMPTING TO CONNECT DESTINATION TELEPHONE AND PROVIDING INFORMATION ASSISTANCE UPON DETECTION OF UNSATISFACTORY CONNECTION

CROSS-REFERENCE TO RELATED APPLICATIONS

This is a continuation of U.S. patent application Ser. No. 09/135,155, filed Aug. 17, 1998, which was a continuation of U.S. patent application Ser. No. 08/552,222, filed Nov. 2, 1995, issued Aug. 18, 1998 as U.S. patent No. 5,797,092, which was a continuation-in-part of U.S. patent application Ser. No. 08/498,900, filed Jul. 6, 1995, now abandoned, which was a continuation-in-part of U.S. patent application Ser. No. 08/234,644, filed Apr. 28, 1994, now abandoned.

FIELD OF THE INVENTION

The present invention relates to systems for providing directory assistance services, and more particularly relates to the provision of directory assistance services to cellular telephone subscribers.

BACKGROUND OF THE INVENTION

Telephone directory assistance services have been available for the past century. While improvements have been made over the decades, such systems are still poorly suited for use by subscribers of cellular telephone services.

In prior art directory assistance services, a customer dials an operator and identifies the name and address of a party whose telephone number is desired. The operator then locates the number, using printed directories or a computer database, and provides the number to the customer. (The provision of the number is sometimes done by the live operator, but more typically is done with a computerized voice response unit that provides a synthesized voicing of the number.) After the customer's inquiry has been satisfied, the connection to the operator is terminated.

While satisfactory for most customers, this arrangement is ill-suited for many cellular telephone customers. For one, such customers are usually away from their general work environments (e.g. in a vehicle), and thus may not have ready access to a pencil and paper in order to make a note of the desired number. (Even if such materials are available, the customer may not find it convenient to interrupt other activities, e.g. driving, in order to make a note.) In addition, the process of initiating a second call—to the desired party—entails further manual operations (e.g. hanging up, waiting for another dial tone, and dialing) which may be a hindrance to the customer's other activities.

The present assignee, in the prior art, has redressed certain of these difficulties by providing a directory assistance service that eliminates the need to make a note of the desired number, or undertake a redialing exercise. Instead, after determining the telephone number desired by the customer, rather than voicing it to the customer, the directory assistance operator goes ahead and initiates a call to the desired party, and connects the new outgoing call to the original customer. (The operator may stay on the line as a conferenced party so as to provide further assistance, or may withdraw from the connection, depending on the particular implementation.) This arrangement obviates the need for the customer to make a note of the voiced number, or to undertake a redialing exercise. However, if the initiated call is not completed (e.g. a "busy" tone is received), or if the customer desires further directory assistance, then the customer must again call the directory assistance operator for help.

The problems associated with providing directory assistance services to cellular customers are not limited to hardships on the customers; the directory assistance service and the cellular carrier also confront unique issues. In the assignee's prior art system, for example, the cellular carrier (which is typically responsible for billing of the customer) knows only that the customer has dialed the directory assistance operator, but does not know the number to which the customer is ultimately connected by the operator. Billing is thereby complicated. In the prior art system, the toll charges (assuming toll calls are permitted; often they are not) for the connection between the customer and the desired number are simply absorbed by the directory assistance service, and recouped by billing the cellular carrier a sufficiently large flat rate charge for each directory assistance call so as to cover these costs. The cellular carrier then bills the subscriber a fixed amount for each directory assistance inquiry, regardless of the toll charges of any further connection established for the customer by the directory assistance operator. This arrangement, however, has a number of disadvantages. In addition to increased cost, it also fails to provide the cellular carrier useful information about its customers' calling patterns, which may affect decisions relating to system expansion, etc.

SUMMARY OF THE INVENTION

In accordance with one preferred embodiment of the present invention, a directory assistance service is provided which alleviates many of these drawbacks of the prior art. For example, in one embodiment, a customer who wishes directory assistance services is connected in the conventional manner to an operator who determines the destination telephone number desired by the customer. As in the prior art, the operator then initiates a call connecting the customer to the destination telephone number. However, rather than dropping all further involvement with the call, this embodiment of the present invention continually monitors the connection thereby established for a predetermined DTMF signal issued by the customer, such as that obtained by pressing the "*" button or some other button. If such a signal is detected, the customer is transferred to a directory assistance operator, who can then provide whatever further assistance is needed (e.g. redialing a busy number, or providing further directory assistance). By this arrangement, the press of a single button by the customer summons further directory assistance, rather than the redialing procedure required by the prior art.

The preferred embodiment further addresses the billing difficulties associated with completion of customer calls by directory assistance operators. According to this aspect of one preferred embodiment, the directory assistance service logs, in a billing database, information identifying the customer (i.e. the customer identification number accompanying the call from the cellular provider), the destination number to which the customer is connected, and the date, time and duration of the customer/destination number connection. This log of information is periodically provided to the cellular carrier, allowing it to bill the customer for the call connected by the directory assistance operator and recoup the associated expense. This permits the flat rate charged by the directory assistance provider to be reduced correspondingly, and provides the cellular service with more detailed information about its customers' usage requirements.

DETAILED DESCRIPTION

Figure 1:
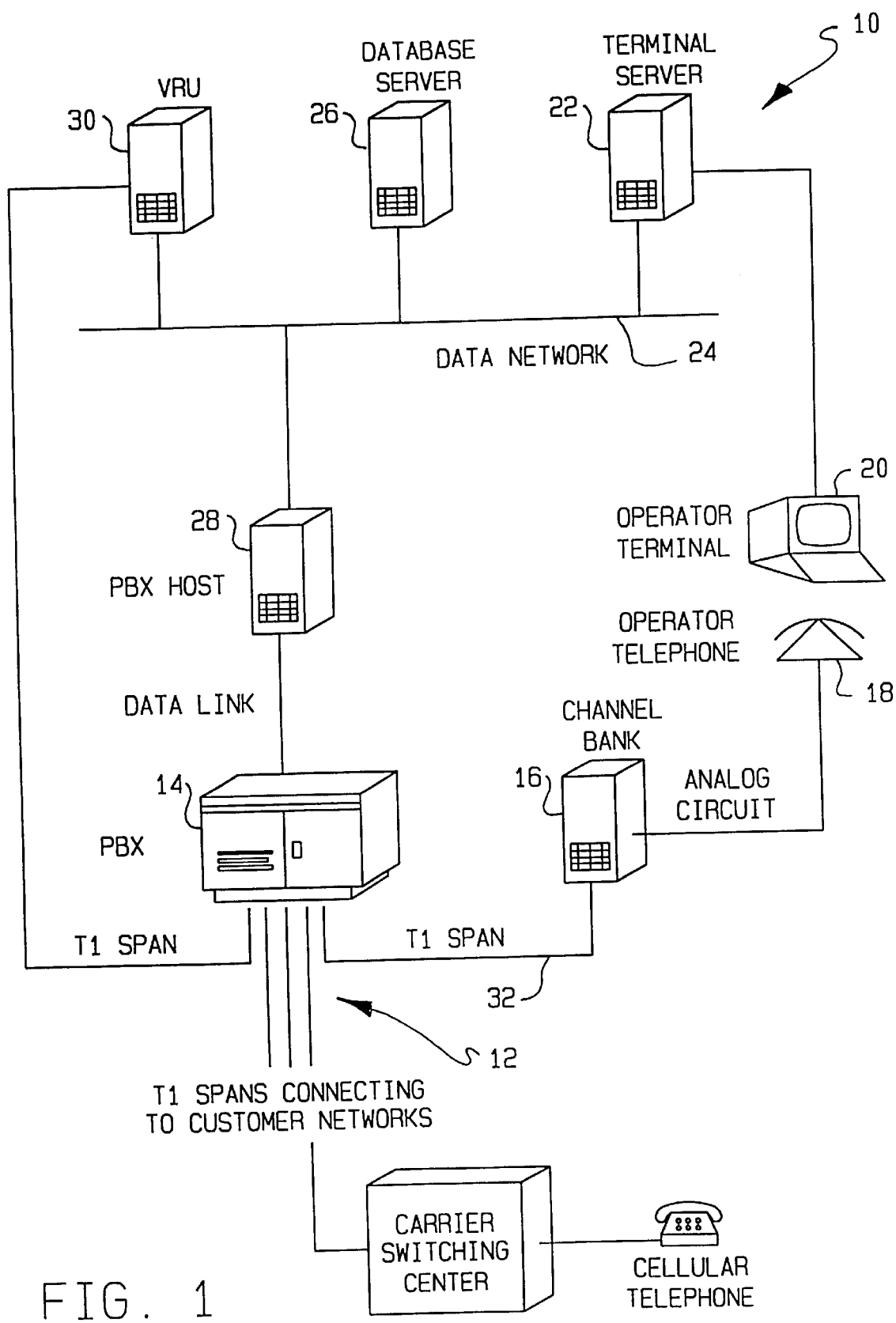
FIG. 1 is a block diagram depicting the hardware used to implement one embodiment of the present invention.

With reference to FIG. 1, a directory assistance center 10 according to a preferred embodiment of the present invention includes one or more T1 links 12 for connection to customer networks, a private branch exchange (PBX) 14, and a channel bank 16 for coupling to a plurality of operator telephones 18. Each operator is further equipped with a terminal 20 that includes a video display unit and a QWERTY keyboard with associated dialing pad. The operator terminals are coupled to a terminal server 22, which in turn is connected over a data network 24 to a database server 26. The data network further connects to a PBX host computer 28 and a voice response unit (VRU) 30. The data network consists of, but is not limited to, a Local Area Network (LAN) supplemented by a number of point-to-point serial data links.

The T1 links 12 provide connection between the directory assistance center 10 and the cellular carrier's switching center, through which incoming directory assistance calls are received. The T1 links 12 further provide connection to the network over which outgoing calls are placed (which network may be different than that used for incoming traffic).

The PBX 14 is conventional, and its operation is governed by instructions stored in the PBX host computer 28. These instructions simply implement the processes hereafter described. In the preferred embodiment, the PBX supports digital T1 telephone circuits, while in other embodiments other PBXs can of course be used. Included in the PBX is digital signal processing circuitry which provides the requisite conference capability (described below), and dual tone multi frequency (DTMF) and multi frequency (MF) tone generation/detection capabilities.

Incoming calls received by the PBX 14 are connected to an available operator via a T1 circuit 32 that is connected through the channel bank 16 to an operator's telephone headset. If no operator is available when a call is received, the call is queued until an operator becomes available. The queuing and call distribution is standard Automatic Call Distribution (ACD).

The terminal server 22 simply serves as an interface between serial devices, such as the operator terminals 20, and the data network 24, allowing the terminals to login as devices on the network.

The database server 26 provides operators with the means to search for a customer's desired party, and determine the appropriate telephone number. In the preferred embodiment, the database provides the capability to search not just by name and address, but also by type of goods/services and/or geographical region. (E.g. the preferred database can answer queries soliciting the names/numbers of shops carrying model rocketry supplies in southeast Portland, Oreg., or of Chinese restaurants on a given street.) Data indexed in this fashion is usually not commercially available, so the present assignee starts with a commercially available database file (e.g. the Directory Assistance Database Source available from U.S. West), and enriches it by adding further data manually.

Desirably, the results of the database search presented on the operator's terminal 20 are not alphabetized prior to display, but rather are presented in the order located by the database search engine. (If desired, a deliberate randomization of order could be effected before display). Businesses at the beginning of the alphabet are thereby not unduly favored by customers using the directory assistance service.

The database software itself is conventional. The presently preferred best mode us to use a relational database, such as is available from Sybase. However, much simpler software can alternatively be used, such as DBase 4.

The voice response unit (VRU) 30 is incorporated into the system to play the constantly repeated parts of an operator's speech, namely the various greetings and signoffs (or closings). Not only does this system provide a voice-saving and monotony-relief function for the operators, it performs a 'branding' function (i.e. the pre-recorded messages incorporate the name of the telephone company through which the customer was routed to the directory assistance service), and it also reduces the amount of time an operator is actually connected to a customer.

The VRU 30 is connected via the data link 24 to the PBX host 28 (to which it acts as a slave processor) and via one or more T1 spans to the PBX 14 itself. More than one VRU can exist in a system. At appropriate stages in a call progression, the PBX host 28 initiates a voice path connection between the VRU and the PBX such that the caller, or the caller and the operator, are able to hear whatever pre-recorded speech is played on that circuit by the VRU. It then instructs the VRU, via the data network, what type of message to play, passing data parameters that enable the VRU to locate the message appropriate to the call state, the service-providing telephone company, and the operator. The recording density used is high enough to provide a good enough quality of message playback that most users of the system should be unaware they are listening to a recording.

Method of Operation

Customers of a particular telephone company simply dial the access digits established for directory assistance by that company. Examples of typical access digits are "*555" and "555-1212 ."

The participating telephone company's own switching system will then reroute the call to the directory assistance service center 10 (via a T1 channel), where it appears as an incoming call.

Automatic Call Distribution (ACD) logic is used to queue (if necessary) and distribute calls to operators in the order in which they are received, and such that the call traffic is distributed evenly among the operators.

When a call is connected to an operator, the VRU 30 (also conferenced into the call) plays a greeting message, using a message pre-recorded by the connected operator. Both the operator and the calling customer hear the message, which incorporates the name of the service or company to which the customer is a subscriber (in other words, the call is "branded"). The message ends with a prompt, thus cuing the customer to volunteer what information they are seeking.

When the automated greeting is complete, the VRU is disconnected, and the operator and the customer are left connected by a 2-way speech path. From this point, the caller is interacting with a live operator.

In the event that the VRU is non-functional (for whatever reason), the incoming call is connected to the operator and a short "trill," or "zip" tone is played to indicate that a caller is on the line. (Note that once operators are logged in to the system, they wear headsets, and have their telephones 18 permanently off-hook. Their telephones do not ring when a call is presented). The operator then speaks a greeting and prompt in real time, instead of the VRU playing a message.

If the caller requests information concerning, for example, local theater performances, the operator speaks a response based on hard copy information. At this point, the caller will be released from the call, and the operator becomes available to handle further calls.

If the caller is seeking directory assistance, the operator will engage in live dialogue to establish the name and other pertinent information of the wanted party, and then initiate a database search using the operator terminal 20 and associated database server 26. In the event of an unsuccessful search, the operator will use alternative sources, such as the Electronic White Pages (EWP) or even printed directories.

The operator can connect the caller to the wanted party's number using one of two possible methods of call transfer: Blind Transfer or Hotline Transfer.

In either case, the call transfer is invoked by sending a sequence of digits (that includes the wanted party's number) to the PBX host 28. The conventional method of doing this is simply dialing the digits on the operator's telephone handset (having first depressed the "flash" key to obtain dial tone). This method is always available. A much quicker and more accurate call completion method is generally preferred: the operator highlights the desired database entry on the screen of the terminal 20, and then initiates Blind or Hotline transfer to that number by entering a few keystrokes on the terminal keyboard. In this case, the database server 26 transmits the same digit sequence as part of a message to the PBX host 28, via the network 24.

More specifically, in the preferred automated call completion method, the operator locates the desired listing in the database, and presses the "enter" key at the operator terminal 20 to select the listing. Whereupon, the operator terminal 20 displays a main call completion menu along with a selected listing. One example of such a menu is as follows:

Main Call Completion Menu
1) Connect with Transfer back
2) Connect with NO Transfer back
3) Conference connect with Transfer back
4) Conference connect with NO Transfer back.
5) Supervisor
6) Manual Dial
7) No connect Options (1) and (2) of the main call completion menu initiate the "Blind Transfer" to the selected listing as described more fully below. Options (3) and (4) initiate the "Hotline Transfer" described more fully below. Option (5) is selected by the operator to summon the operator's supervisor for assistance handling the call. Option (6) overides automated dialing of the selected listing, and allows the operator to manually dial a number at the operator terminal 20. Option (7) cancels call completion.

When the operator selects option (6), the operator terminal 20 displays a call completion sub-menu such as follows:

Manual Dial Call Completion Sub-Menu
Enter telephone number
1) Connect with Transfer back
2) Connect with NO Transfer back
3) Conference connect with Transfer back
4) Conference connect with NO Transfer back
5) Supervisor
6) Change-Number
7) No connect Upon selection of any of the connection options (1)–(4) of either the main call completion menu or manual dial call completion submenu, the database server 26 sends a data packet to the PBX host 28, via the network 24. The data packet contains the appropriate station ID and the digit sequence of the selected listing or manually entered telephone number in the case of option (6). The PBX host 28 creates a conference bridge with the caller and the called party, then either completes the "Blind Transfer" in the case of options (1) or (2) or continues with the "Hotline Transfer" in the case of options (3) or (4). In the case of options (1) or (3), the tone triggered return transfer operation which is described more fully below is enabled during the call. In the case of options (2) or (4), the tone triggered return transfer or transfer back operation is disabled as also discussed more fully below.

"Blind Transfer" is the normal means by which an operator establishes a connection between the caller and the wanted party's number. As soon as the PBX host 28 receives the Blind Transfer command (whether from the database server 26 or the operator's telephone set 18), an attempt is made to establish a route out of the PBX 14. If successful, the circuit is seized and the address digits propagated, using the protocol the circuit is configured for: the operator is released from the call and made available to receive further calls. If the VRU 30 is operational, it is commanded to play a signoff message (pre-recorded by the just-released operator). If the VRU is not available, the operator speaks the signoff message before initiating the transfer. The VRU status is known by whether the call was initiated by a VRU-played greeting, or by zip tone. Failed routing attempts cause reorder tones to be returned to the operator's handset, or an error indication to be returned to the database server 26 (depending on how the PBX host received the transfer command).

Like Blind Transfer, the "Hotline Transfer" method of establishing a connection between the caller and the wanted party's number can be initiated by the operator from either the telephone handset 18 or from the data terminal keyboard 20. The difference is that the operator is not automatically released from the call in a Hotline Transfer. Instead, he/she is conferenced into the call by the PBX 28 and is able to monitor its progress. Using either the telephone handset or the data terminal keyboard, the operator may withdraw from the call after verifying its establishment, or may cause the called circuit to be released and then re-engage in dialogue with the caller.

Hotline Transfers are used when a caller requests that the operator "stay on the line."

If, after initiation of a transfer (whether or not it succeeds), and at any time before the caller hangs up, the caller requires further operator assistance, the caller can perform a tone signal triggered, return transfer back to an operator (hereafter referred to as "tone triggered return transfer" or "transfer back"). This is done simply by pressing the "*" (star) key or another designated key on the caller's telephone once or twice (depending on the system, and as instructed by the operator in the signoff message).

The star or other designated key tone(s) is detected by a DTMF receiver (allocated in the PBX 14 for the entire duration of the call), and causes the caller to appear as a fresh call to the ACD logic. This in turn results in the caller being connected to an available operator, whereupon the PBX host 28 instructs the connected VRU 30 to play the appropriate pre-recorded signoff message with return transfer instructions. Note that the operator to whom the call is connected is allocated according to the ACD algorithm, and may or may not be the same operator that previously handled this call. From this point, the call is treated in the same way as a non-tone triggered return transfer call.

The "tone triggered return transfer" feature enables callers who have been transferred by means of a Blind Transfer to recall an operator if the transfer does not complete satisfactorily (for example, receipt of reorder tone, busy tone, operator intercept tritones, ring-no-answer, silence, or wrong number). It also enables a caller to request a follow-on call at the completion of a successfully completed call without incurring the delay or difficulty of re-dialing into the system.

It will be recognized that, in the preferred embodiment, the desired number is not voiced to the customer unless explicitly requested. Sometimes a customer uses the "tone triggered return transfer" feature to request that the number be voiced if, for example, he or she finds a follow-up call is necessary later.

Figure 2:
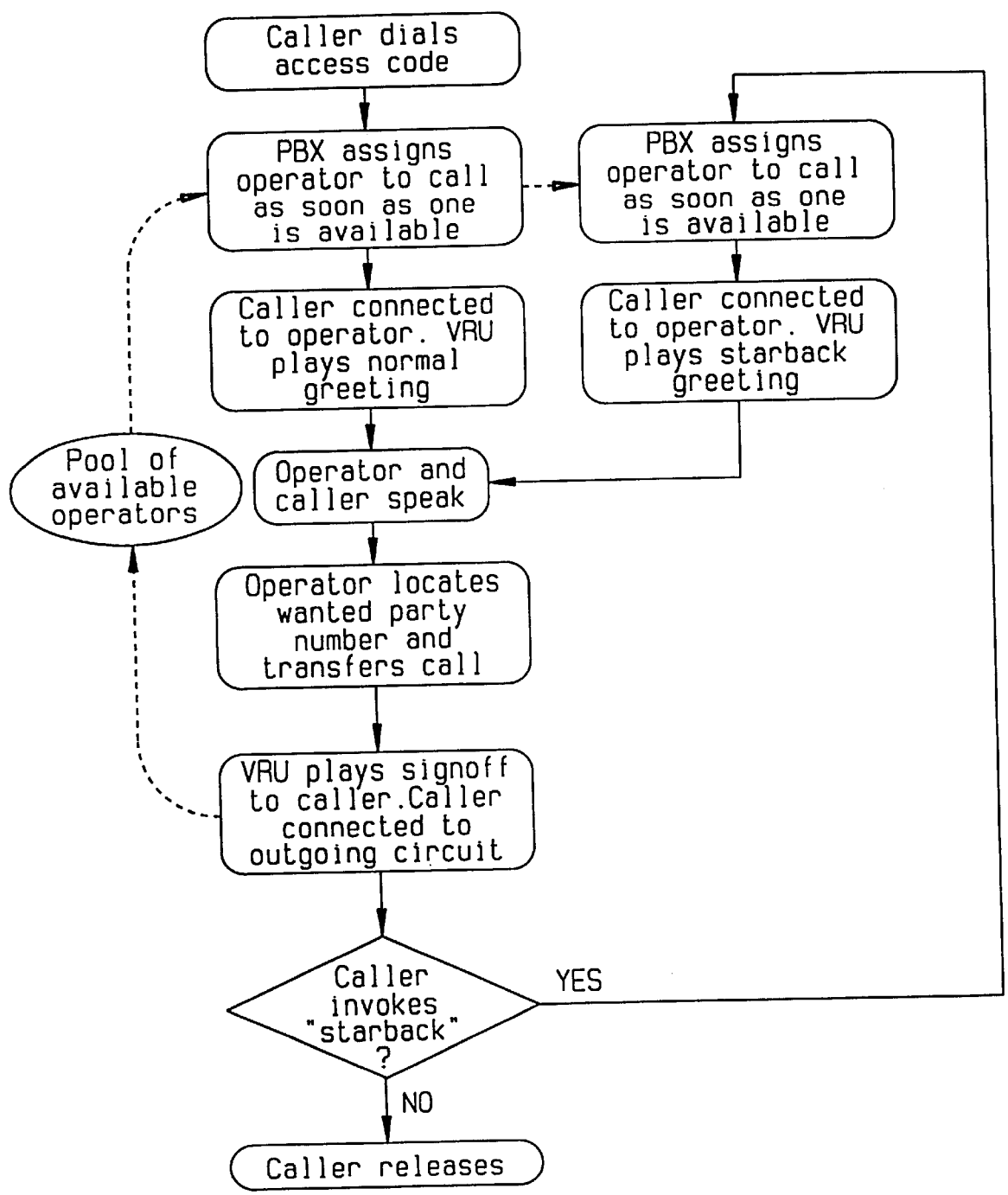
FIG. 2 is a flow chart depicting the process by which directory assistance is provided to a customer in accordance with the FIG. 1 embodiment.

A flow diagram illustrating the sequence of events in a directory assistance system employing the present "tone triggered return transfer" technique is provided in FIG. 2.

The "tone triggered return transfer" technique enables the cost-effective provision of many services not previously available. For example, a directory assistance center may offer mapping/locator services which provide spoken directions to guide vehicle-based customers from their present location to a desired destination. However, to obviate the need for the customer to write the directions down while in the vehicle, the operator should be available to issue instructions along the course of the vehicle's route. By using the "tone triggered return transfer" or "transfer back" feature, the customer can receive initial instructions, and thereafter summon further instructions as needed along the route simply by pressing the star or other designated key. In such a system, the customer's connection to the directory assistance center is maintained during the course of the trip, but the operator can attend to other customers while the travelling customer doesn't need the operator's immediate attention. (Since "tone triggered return transfer" may return the customer to a different operator, provision is made for transferring—with the customer—a pointer to the particular database record (i.e. map or directions) being utilized by that customer, and a pointer to a current location within that record. By this arrangement, a different operator who is summoned for assistance using the "tone triggered return transfer" feature can pick up where the last operator left off.) While driving between operator instructions, the customer is simply kept in a "hold" state.

Sometimes the customer will be connected to a destination telephone number that makes its own use of "*" or other designated key tone. For example, some automated order entry systems require the caller to press the "*" key to signal the end of an entry, etc. Others require the caller to press the "*" key to access certain information.

To accommodate such possibilities, the preferred embodiment of the present invention stores data in database 26 to indicate which destination numbers make their own use of the "*" key or other transfer back feature designated key or key series. If the customer is connected to such a destination telephone, then the "tone triggered return transfer" feature is disabled. If the user presses the "*" key while connected to such a destination number, it is ignored by directory assistance center 10. But when the customer thereafter calls another destination telephone number that is not so listed in the database, the "tone triggered return transfer" feature is once again available.

Sometimes database 26 may not contain complete information identifying destination numbers that make their own use of the "*" key. Moreover, some directory assistance systems may not track this data at all. In such circumstances, the directory assistance center 10 desirably includes provision to manually disable the "tone triggered return transfer" tone detector. This disabling can be done by operating a switch at the operator's console, by entering a command on the operator's keyboard, or by activating an icon on the operator's terminal 20.

Such a manual disabling of the "tone triggered return transfer" tone detector can occur, for example, when a caller is inadvertently transferred back to the operator by using the "*" key to access a service at the destination number. The caller can note the problem to the operator, who can disable the feature and reconnect the caller to the destination number. In other situations, the caller may know in advance that the destination number makes use of the "*" key (e.g. for electronic banking), and can request that the operator disable the "tone triggered return transfer" tone. detector before the connection is first made.

Billing Issues

Although these can be varied, there are three billing components of a typically cellular-phone originated call to a directory assistance service according to the present invention:

1) "Air time," or the total time the caller uses the cellular carrier's cellular radio system to carry a call from his/her cellular telephone. This is the responsibility of the cellular carrier.

2) The per-call charge levied for use of the directory assistance service. This charge is made by the directory assistance service to the cellular carrier on the basis of the number of calls received from the carrier in a particular time period.

3) Toll charge—the charge levied by a carrier for the duration of an answered connection over a toll route originated by a directory assistance operator. This charge is levied by the carrier used for completion of customer calls originated by the directory assistance operator. The cellular carrier is dependent on the directory assistance service to provide enough details of these calls to enable it to accurately bill its subscribers accordingly. There are two ways of doing this:

1) The directory assistance service provides "tickets" of all calls that were transferred and answered. The precise content and format of the ticket is customer-defined, but includes at least the following information: calling number, called number, date and time of connection (i.e. when answer indication was received), and duration of call. The ticket files can be transferred on magnetic tape or by means of electronic file transfer.

2) The digits that are dialed by the directory assistance service's PBX to initiate the call transfer (via the cellular carrier's network) can incorporate the calling party number ("A" Number Identification, or ANI). The cellular carrier's own switching equipment then has all the information needed to generate the required tickets.

It is the cellular carrier's responsibility to rate the calls and determine what charge is to be levied.

Having described the principles of our invention with reference to a preferred embodiment and certain variations thereon, it should be apparent that these examples can be modified in arrangement and detail without departing from such principles. For example, while the invention has been illustrated with reference to a system in which a "tone triggered return transfer" customer is routed back to the next available operator, in other embodiments, provision can be made for routing the customer back to the original operator. (In some systems, the customer can be given a choice: pressing one key for the first available operator, and another key to be inserted in the original operator's queue.)

In view of the many possible embodiments to which the principles of our invention may be put, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. A method for managing, by an information assistance service provider, a call received through a first carrier network not controlled by the information assistance service provider, the call being connectable to a desired party through a second carrier network also not controlled by the information assistance service provider, the method comprising:

receiving the call by a caller through the first carrier network;

receiving from the caller an information assistance request for a suggestion of a goods or service provider, which is unaffiliated with the information assistance service provider;

searching a database for search results including a telephone number associated with a communications device which satisfy the request;

establishing a connection for connecting the caller to the communications device through the second carrier network; and allowing the caller to be connected to an information assistance service provided by the information assistance service provider before the caller terminates the call.

2. The method of claim 1, wherein the information assistance provider includes an operator.

3. The method of claim 2, wherein the operator becomes a conferenced party in attempting to establish the connection.

4. The method of claim 1, further comprising detecting an input by the caller.

5. The method of claim 4, further comprising connecting the user to an information assistance service provided by the provider upon detection of the input.

6. The method of claim 1, wherein the first carrier network and the second carrier network are the same network.

7. The method of claim 1, further comprising determining whether the connection is satisfactory.

8. The method of claim 7, wherein it is determined that the connection is not satisfactory upon receipt of a reorder tone.

9. The method of claim 7, wherein it is determined that the connection is not satisfactory upon receipt of a busy tone.

10. The method of claim 7, wherein it is determined that the connection is not satisfactory upon receipt of an operator intercept tone.

11. The method of claim 7, wherein it is determined that the connection is not satisfactory when a ring-no-answer is detected.

12. The method of claim 7, wherein it is determined that the connection is not satisfactory when silence is detected.

13. The method of claim 1, wherein the goods or service provider is located in a given geographic area.

14. The method of claim 1, wherein the goods or service provider includes a restaurant.

15. The method of claim 1, wherein the search results include information concerning a plurality of goods or service providers satisfying the request.

16. The method of claim 15, wherein the plurality of goods or service providers are presented in a selected order.

17. The method of claim 16, wherein the selected order includes a random order.

18. A method for providing an information assistance service, the method comprising:

receiving by an information assistance service provider a call from a caller over a first carrier network;

receiving from the caller an information assistance request for a suggestion of a goods or service provider, which is unaffiliated with the information assistance service provider;

searching a database for a selected goods or service provider satisfying the request and the connection information concerning the selected goods or service provider;

attempting to connect the caller over a second carrier network to the selected goods or service provider based on the connection information; and allowing the caller to be connected to an information assistance service provided by the information assistance service provider when an indication that the caller will not be able to communicate with the selected goods or service provider is received.

19. The method of claim 18, wherein the provider includes an operator.

20. The method of claim 19, wherein the operator becomes a conferenced party in attempting to connect the caller to said communication device.

21. The method of claim 18, wherein the indication includes a reorder tone.

22. The method of claim 18, wherein the indication includes a busy tone.

23. The method of claim 18, wherein the indication includes an operator intercept tone.

24. The method of claim 18, wherein the indication includes a ring-no-answer condition.

25. The method of claim 18, wherein the indication includes a silence condition.

26. The method of claim 18, further comprising detecting an input by the caller.

27. The method of claim 26, further comprising connecting the caller to an information assistance service provided by the information assistance service provider upon detection of the input.

28. The method of claim 18, wherein the first carrier network and the second carrier network are the same network.

29. The method of claim 18, wherein the selected goods or service provider is located in a given geographic area.

30. The method of claim 18, wherein the selected goods or service provider includes a restaurant.

* * * * *